(12) United States Patent
Sharma et al.

(10) Patent No.: US 12,471,928 B2
(45) Date of Patent: Nov. 18, 2025

(54) REPOSITIONABLE OVER-THE-SCOPE CLIP WITH CANCER SEEDING PREVENTION IN FULL TISSUE RESECTION

(71) Applicant: BOSTON SCIENTIFIC MEDICAL DEVICE LIMITED, Galway (IE)

(72) Inventors: Deepak Kumar Sharma, Muzaffarnagar (IN); Sharath Kumar G, Kanakapura (IN)

(73) Assignee: Boston Scientific Medical Device Limited, Galway (IE)

( * ) Notice: Subject to any disclaimer, the term of this patent is extended or adjusted under 35 U.S.C. 154(b) by 454 days.

(21) Appl. No.: 18/180,631

(22) Filed: Mar. 8, 2023

(65) Prior Publication Data
US 2024/0008878 A1    Jan. 11, 2024

Related U.S. Application Data

(60) Provisional application No. 63/367,786, filed on Jul. 6, 2022.

(51) Int. Cl.
*A61B 17/128* (2006.01)
*A61B 17/00* (2006.01)

(52) U.S. Cl.
CPC .................. *A61B 17/1285* (2013.01); *A61B 2017/00296* (2013.01)

(58) Field of Classification Search
CPC . A61B 17/1285; A61B 17/1227; A61B 17/10; A61B 17/083; A61B 2017/00296; A61B 2017/00486; A61B 2017/00477; A61B 2017/00818; A61B 2017/00867; A61B 2017/00907

See application file for complete search history.

(56) References Cited

U.S. PATENT DOCUMENTS

| 5,782,865 | A  | * | 7/1998 | Grotz | A61B 17/0642 |
|---|---|---|---|---|---|
|  |  |  |  |  | 606/328 |
| 2013/0226199 | A1 | * | 8/2013 | Harris | A61B 17/10 |
|  |  |  |  |  | 606/142 |
| 2014/0228864 | A1 | * | 8/2014 | Jugenheimer | A61B 17/122 |
|  |  |  |  |  | 606/157 |
| 2016/0228108 | A1 | * | 8/2016 | Raybin | A61B 17/0057 |
| 2021/0137507 | A1 | * | 5/2021 | Keren | A61B 17/1285 |
| 2022/0110652 | A1 | * | 4/2022 | Gregan | A61B 1/0014 |

* cited by examiner

*Primary Examiner* — Ryan J. Severson
(74) *Attorney, Agent, or Firm* — Fay Kaplun & Marcin, LLP

(57) ABSTRACT

A clipping system includes a clip, extending and control members and an endcap mounted on an insertion device. A planar body of the clip includes first and second cut-outs defining fingers. The control members slide within extending members to releasably couple to the clip so that movement the control members moves the clip between an insertion configuration, an initial deployed configuration and a review configuration in which the end cap is withdrawn proximally away from the clip to enhance visual observation of the clip. The control member is operable to retract the clip proximally over the end cap toward the insertion configuration so that the fingers are forced open as the clip is retracted over the end cap, freeing the clip from tissue on which it had been clipped to reposition the clip if necessary.

20 Claims, 10 Drawing Sheets

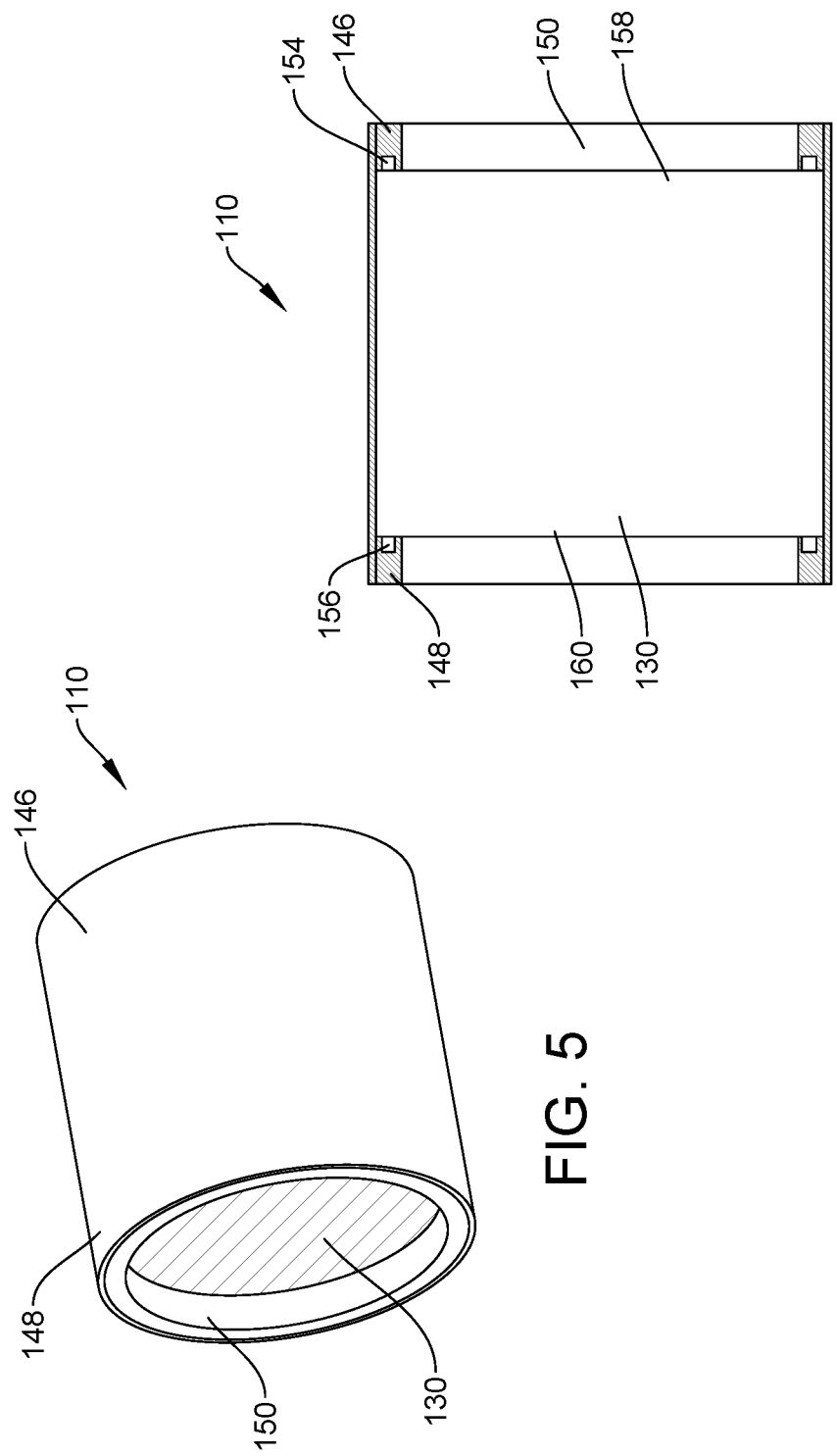

REPOSITIONABLE OVER-THE-SCOPE CLIP WITH CANCER SEEDING PREVENTION IN FULL TISSUE RESECTION

PRIORITY CLAIM

The present disclosure claims priority to U.S. Provisional Patent Application Ser. No. 63/367,786 filed Jul. 6, 2022; the disclosure of which is incorporated herewith by reference.

FIELD

The present disclosure relates to endoscopic devices and, in particular, relates to endoscopic clipping device for treating tissue along the gastrointestinal tract.

BACKGROUND

Some endoscopic procedures (such as the removal of larger lesions (cancerous and other); tunneling under the mucosal layer of the GI tract to treat issues below the mucosa; full thickness removal of tissue (cancerous and other); treatment of issues on other organs by passing outside of the GI Tract (Natural Orifice Transluminal Endoscopic Surgery aka NOTES®)); and endoscopic treatment/repair of post-surgical issues (e.g., post-surgical leaks, breakdown of surgical staple lines and/or anastomotic leaks); may increase the risk, in certain cases, of, for example, intrabdominal hypertension and seeding of cancer cells. In addition, these procedures generally create tissue openings that need to be hemo-statically sealed.

SUMMARY

The present disclosure relates to a clipping system for treating tissue. The system includes an end cap configured to be mounted over a distal end of an insertion device, the end cap extending from a proximal end to a distal end and including a channel extending therethrough.

The system also includes a clip including a body having first and second sets of cut-outs extending therethrough, the first and second cut-outs defining a plurality of fingers in the body, the fingers being configured to clip target tissue therebetween, each of the first cut-outs extending from a radially outer edge of the body toward a center point of the body, each of the second cut-outs extending from a first end at the center point toward a second end between adjacent ones of the first cut-outs so that the first ends of each of the second set of cut-outs are open to one another to form a single opening via which the clip is mountable over the end cap, the clip being movable between an insertion configuration, in which the clip is mounted over the end cap with the fingers extending along an exterior surface of the end cap so that tips of the fingers are separated from one another in an open configuration to receive tissue therebetween, and an initial deployed configuration, in which the clip is moved distally off of the end cap so that the tips of the fingers revert toward a biased closed configuration in which the tips are pointed radially inward toward the center point to grip tissue therebetween.

In addition, the system includes extending members extending along an exterior of the end cap and longitudinally movable relative thereto.

Furthermore, the system includes control members slidably received within the extending members, each of the control members being received within a corresponding one of the extending members so that distal ends of the control members extend distally past distal ends of the extending members to be releasably coupled to the clip so that longitudinal movement of one of the control members and the extending members relative to the end cap moves the clip between the insertion configuration, the initial deployed configuration, and a review configuration, in which the end cap is withdrawn proximally away from the clip while the control members remain coupled to the clip, the control member being operable to retract the clip proximally over the end cap to force the fingers open as the clip is retracted over the end cap, freeing the clip from tissue on which it had been clipped.

In an embodiment, the surface is substantially planar and wherein a radially outer edge of the clip curves proximally direction to facilitate retraction of the clip over the end cap toward the insertion configuration.

In an embodiment, each of the control members includes an enlarged distal end engaging a first surface of the body of the clip which, in an operative position, faces away from the end cap, so that a proximal portion of each of the control members extends proximally through a corresponding opening of the clip to a proximal end accessible to a user.

In an embodiment, the corresponding opening extends through a portion of the body of the clip adjacent the outer edge between adjacent ones of the first cut-outs, from the first surface of the body to a second surface of the body which, in the operative position, faces the end cap.

In an embodiment, the enlarged distal end of each of the control members is connected to a proximal portion thereof via a joint configured to release when subject to a force exceeding a predetermined threshold value.

In an embodiment, the control members and the extending members are configured so that proximal movement of the control members relative to the extending members draws the clip against the distal ends of the extending members to release the joint and move the clip toward a final deployed configuration.

In an embodiment, each of the control members includes a distal portion including the enlarged distal end and a ball-shaped proximal end, the joint including a first collet at a distal end of the proximal portion of a first one of the control members configured to releasably engage the ball-shaped proximal end of the distal portion of the first control member.

In an embodiment, when the first collet is received within a corresponding one of the extending members, the first collet grips the ball-shaped proximal end of the distal portion of the first control member therein, and wherein the first collet is configured so that, when the first collet is moved distally out of the corresponding extending member, the first collet releases the ball-shaped proximal end of the distal portion of the first control member.

In an embodiment, the system further includes a membrane releasably attached to an interior of the channel of the end cap, the membrane extending from a proximal end to a distal and including a channel extending therethrough, the membrane configured to trap tissue received within the channel thereof when released from the end cap.

In an embodiment, the membrane includes a proximal band at the proximal end thereof and a distal band at the distal end thereof, the proximal and distal bands configured to move from a tissue-receiving configuration, in which the proximal and distal bands are expanded so that tissue may be received within the channel, to a collapsed configuration, in which the proximal and distal bands sinched to trap tissue in the channel.

In an embodiment, the distal band includes a snare configured to sever tissue received within the channel of the membrane from surrounding tissue as the distal band is moved from the tissue-receiving configuration to the collapsed configuration.

In an embodiment, the membrane is formed of silicone.

The present disclosure also relates to a clip for treating tissue. The clip includes a body defined via a first surface, a second surface and a curved outer edge. Also, the clip includes a first set of cut-outs extending through the body from the first surface to the second surface, each of the first cut-outs extending from the outer edge toward a center point of the body so that each of the first cut-outs is open to an exterior of the clip at the outer edge. In addition, the clip includes a second set of cut-outs, each of the second set of cut-outs extending through the body from the first surface to the second surface and from a first end at the center point of the body radially outward toward a second end between adjacent ones of the first cut-outs so that the first ends of the second cut-outs are open to one another to form a single opening via which the clip is mountable over a distal end of an insertion device, the first and second cut-outs defining a plurality of fingers including tips which, in a closed configuration, point toward the center point of the body.

In an embodiment, the clip movable between an open configuration in which tips of the fingers are separated from one another so that tissue may be drawn between the fingers, and a closed configuration in which the tips of the fingers spring toward a closed configuration in which the tips point radially inward toward the center point to grip tissue therebetween.

In an embodiment, the outer edge of the clip curves proximally so that the second surface which, in an insertion configuration, faces toward an end cap is convex.

In addition, the present disclosure relates to a method for treating tissue. The method includes inserting a clip to a target area in a body lumen via an endoscope, the clip mounted over a distal end of the endoscope via an end cap, in an open insertion configuration in which fingers of the clip extend along an exterior surface of the clip with tips of the fingers separated from one another to permit tissue to be received therebetween; drawing target tissue into a channel of the end cap and between the fingers of the clip; moving the clip from the open insertion configuration to an initial deployed configuration, in which the clip is pushed distally off of the end cap so that the clip springs to a closed configuration in which the tips of the fingers point toward a center point of the body to grip tissue received therebetween, wherein the fingers are defined via a first set of cut-outs and a second set of cut-outs, each of the first set of cut outs extending through the body from an outer edge toward a center point of the body so that each of the first cut-outs is open to an exterior of the clip at the outer edge, and the second cut-outs extend through the body from a first end at the center point of the body toward a second end between adjacent ones of the first cut-outs, wherein the first ends of the second cut-outs are open to one another to form a single opening via which the clip is mountable over the end cap in the insertion configuration; and drawing the endoscope proximally away from the clip, while the clip remains coupled to distal ends of control members to a review configuration.

In an embodiment, when in the review configuration it is determined that the clip requires repositioning, drawing the control members proximally relative to the endoscope to draw the clip proximally over the end cap to the open insertion configuration, and repositioning the clip over the target tissue.

In an embodiment, the method further includes moving the clip from the review configuration to a final deployed configuration by drawing the control members proximally relative the endoscope to draw the clip proximally against distal ends of extending members through which the control members are slidably received, until a force exerted on the control members exceeds a predetermined threshold force, separating enlarged distal ends of the control members from remaining lengths of the control members to release the clip from the endoscope.

In an embodiment, the method further includes drawing the clipped target tissue into the channel of the end cap and then releasing a membrane releasably attached to an interior of the channel of the end cap over the target tissue to trap the target tissue therein.

In an embodiment, the method further includes cutting the trapped target tissue within the membrane from surrounding tissue and removing the membrane from the body lumen so that the clip remains clipped over the surrounding tissue.

BRIEF DESCRIPTION OF THE DRAWINGS

FIG. 5 shows a perspective view of an end cap including the membrane attached to an interior channel of the end cap, according to the clipping system of FIG. 1;

FIG. 6 shows a cross-sectional side view of the end cap of FIG. 5;

DETAILED DESCRIPTION

Figure 1:
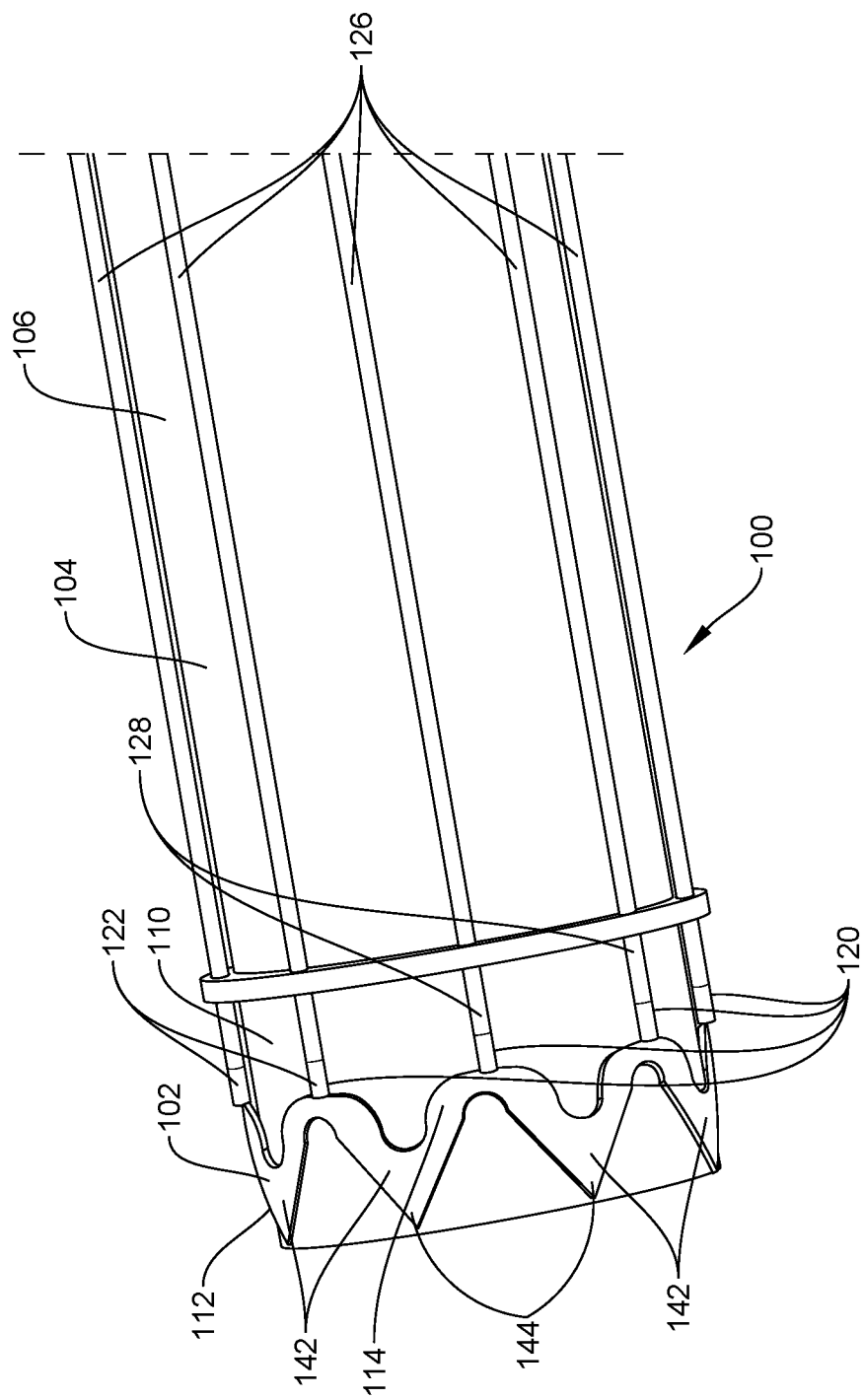
FIG. 1 shows a perspective view of a distal portion of a clipping system according to an exemplary embodiment of the present disclosure in an insertion configuration.
Figure 2:
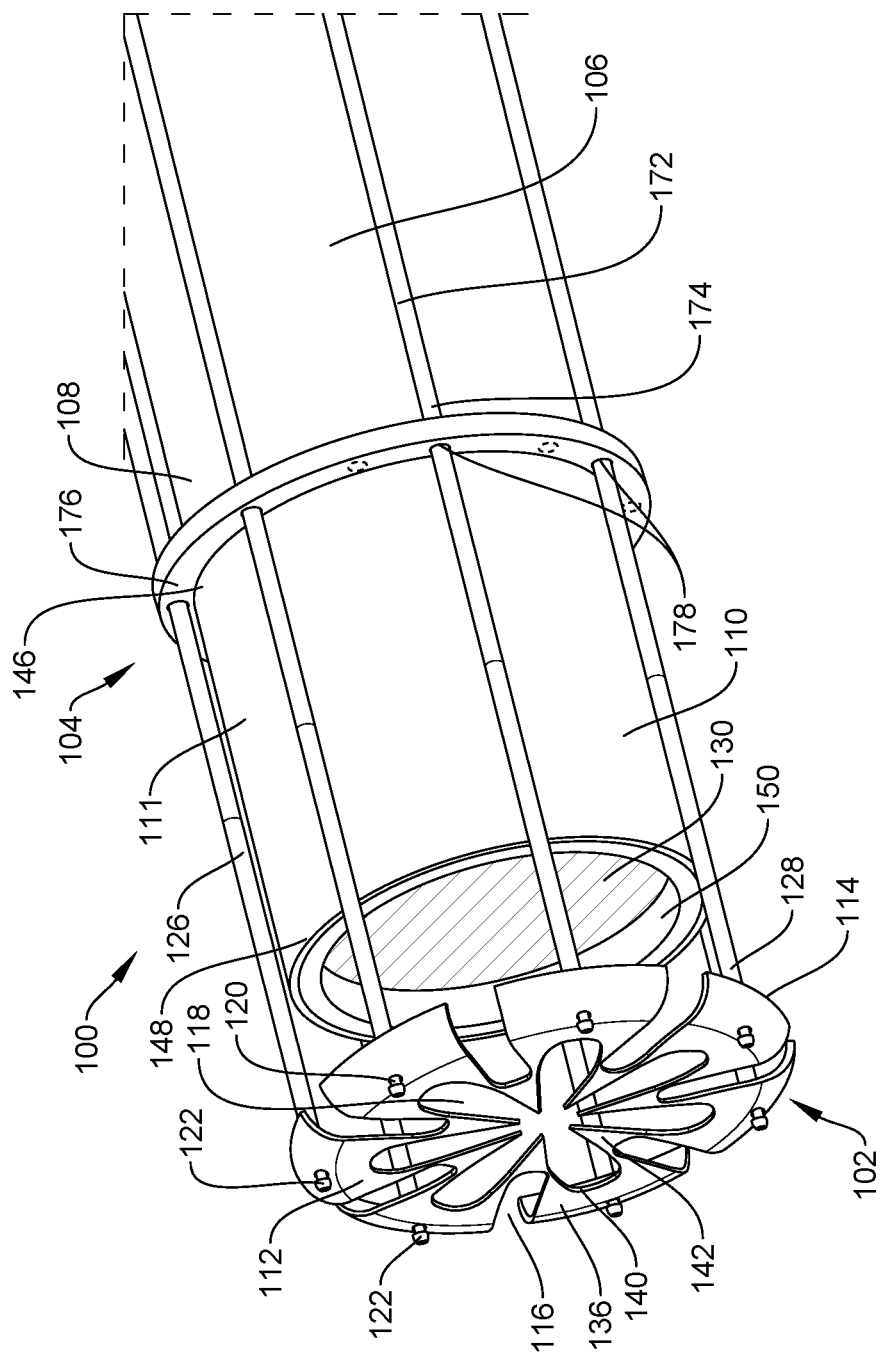
FIG. 2 shows a perspective view of a distal portion of a clipping system according to an exemplary embodiment of the present disclosure in an initial deployed configuration.
Figure 4:
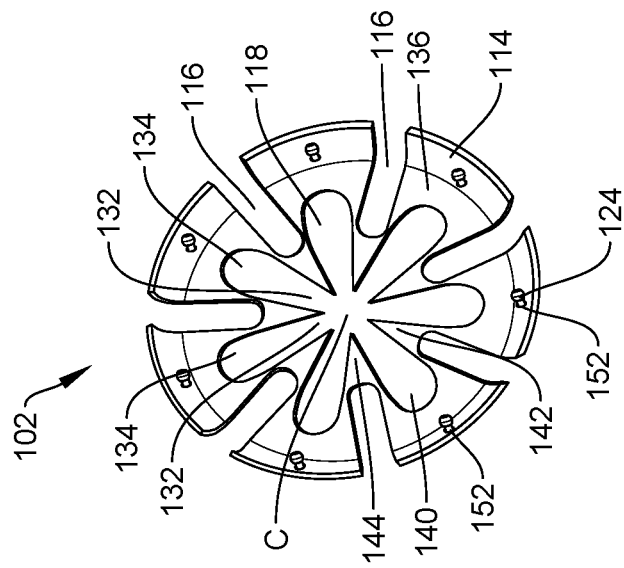
FIG. 4 shows a perspective view of the clip, according to the clipping system of FIG. 1 in a finally deployed configuration.

The present disclosure may be further understood with reference to the following description and the appended drawings, wherein like elements are referred to with the same reference numerals. The present disclosure relates to a clipping system and, in particular, relates to an over-the-scope endoscopic clipping system which may be used, for example, to close tissue openings created through a full thickness resection procedure within the GI tract while hygienically collecting tissue from the clipping site to minimize the potential for seeding of cancer or other undesirable tissues from the resection site to other areas of the body. Exemplary embodiments of the present disclosure comprise a disc-shaped clip configured to be mounted over a distal end of an endoscope via an end cap coupled to the distal end of the endoscope.

The disc-shaped clip includes a plurality of cut-outs configured to create a spring stiffness facilitating movement of the clip between an open configuration and a closed configuration as will be described in more detail below. The clip is releasably coupled to distal ends of control members slidably received within corresponding extending members so that movement of the control members and/or extending members relative to the endoscope moves the clip between an insertion configuration, an initial deployed configuration and a review configuration. In the insertion configuration the clip is mounted over the distal end of the endoscope in the open configuration and in the initial deployed configuration the clip is moved distally off the end cap to the closed configuration to clip tissue that had been drawn into the end cap.

In the review configuration, the endoscope is drawn away from the clip to widen the field of view of the endoscopic vision system so that the user may review the position of the clip relative to target tissue (e.g., a tissue to be clipped). If, in the review configuration, it is determined that the clip is not clipped over the target tissue as desired, the clip may be drawn back onto the endcap (i.e., withdrawn to the insertion configuration) so that the endcap and the clip may be repositioned relative to the target tissue to restart the clipping process. When the clip is again clipped over tissue and it is observed (e.g., in the review configuration) that the clip is clipped over the target tissue as desired, the clip is finally deployed by separating the clip from the control members and/or extending members.

Upon final deployment of the clip, a membrane attached to an interior surface of the end cap is released, trapping the target tissue therewithin to prevent the seeding of cancer cells as the resected tissue is withdrawn from the body. At this point the tissue captured within the membrane may be resected and collected for removal from the body while contained within the membrane (e.g., using a cautery snare or any other known endoscopic technique). The target tissue within the membrane may then be removed from the body while leaving the clip clipped over the target tissue.

It will be understood by those of skill in the art that exemplary embodiments of the present disclosure describe an endoscopic clipping system which may be used to optimize any endoscopic tissue treatment/resection procedure. Although the clipping procedure is described in regard to a full thickness resection procedure those skilled in the art will understand that this is exemplary only and that the exemplary tissue clipping and tissue removal system may be utilized for the closing of tissue openings/defects, wounds, perforations, etc. in regard to any procedure or condition in the gastrointestinal tract. It should be noted that the terms proximal and distal, as used herein, refer to a direction toward and away from, respectively, a user of the device.

As shown in FIGS. 1-14, a clipping system 100 according to an exemplary embodiment of the present disclosure, comprises a clip 102 configured to be inserted through, for example, a body lumen to a target area to clip target tissue 10 (shown in FIG. 3)—e.g., a target portion of tissue or lesion to be clipped. The clip 102 is insertable to the target area via an insertion device 104 including, for example, an endoscope 106 and an end cap 110 mounted (e.g., via a friction fit) over a distal end 108 of the endoscope 106, as shown in FIG. 1. The end cap 110 includes a membrane 130 releasably attached to an interior thereof. The clip 102 is configured to be mounted over the end cap 110 for insertion into the body lumen.

According to an exemplary embodiment, the clip 102 includes a body 112 that includes, in a deployed configuration, a substantially planar distal surface and a radially outer edge 114 that is generally circular. Those skilled in the art will recognize that the body 112 of the clip 102 may take any desired shape in the deployed configuration so long as the tips 144 of the fingers 142 are positioned in this configuration to grip tissue as desired. Thus, the body 112 may be configured so that, in the deployed state the distal surface of the clip 102 need not be planar and may be concave or convex or any more complex shape. The clip 102 includes a plurality of cut-outs 116, 118 defining fingers 142 (shown in FIG. 3) which are configured to allow movement of the clip 102 between an open configuration (shown in FIG. 1), in which the clip 102 is stretched over the end cap 110 so that tips 144 of the fingers 142 are separated from one another to receive tissue therebetween (e.g., tissue drawn into the end cap 110), and a closed configuration, in which the clip 102 is moved distally off of the end cap 110 to spring closed to clip tissue between the tips 144 of the fingers 142. As can be seen in FIG. 1, in the open, insertion configuration, the clip 102 is stretched over the end cap 110 so that the clip 102 assumes the generally cylindrical shape of the end cap 110. Furthermore, as can be seen in FIG. 1, the outer edge 114 of the body 112 extends, in the insertion configuration, along a serpentine path defined by the cut-outs 116 and the portions of the edge 114 therebetween.

The clip 102 is releasably coupled to control members 120, each of which extends through a corresponding extending member 126 so that distal ends 122 of the control members 120 extend distally past distal ends 128 of the extending members 126 to be coupled to the clip 102. The clip 102 is movable between the insertion configuration (FIG. 1) in which the clip 102 is stretched open and mounted on the end cap 110, an initial deployed configuration (FIG. 2) in which the clip 102 is pushed distally off of the end cap 110 spring to the closed configuration to clip tissue that had been drawn into the end cap 110, and a review configuration (FIG. 11) in which the endoscope 106 is withdrawn proximally away from the clip 102 to widen a field of view of the endoscope 106 so that the user may observe the clip 102 and the clipped tissue more clearly to determine whether the clip 102 is clipped over the target tissue 10 as desired.

The clip 102 may be moved between the insertion and initial deployed configurations via movement of the control members 120 and/or the extending members 126 relative to the endoscope 106 and the endoscope 106 may be moved to the review configuration by manipulating the control members 120 and/or the extending members 126 as will be described in detail below. If, in the review configuration, it is determined that the clip 102 is not clipped over the target tissue 10 as desired, the endoscope 106 may be advanced distally toward the clip 102 and the clip may then be withdrawn proximally and stretched again over the end cap 110 moving from the review configuration back to the insertion configuration.

In an exemplary embodiment, the distal end 122 of each of the control members 120 is connected to a remaining length of the control member 120 via a releasable joint 124 so that when, in the review configuration, it is determined that the clip 102 is clipped over the target tissue 10 as desired, the clip 102 may be moved to a final deployment in which the clip 102 is released from the control members 120 by releasing and/or separating the joint 124. As will be described in further detail below, release of the joint 124 may be facilitated by drawing the control members 120 proximally relative to the extending members 126.

Figure 3:
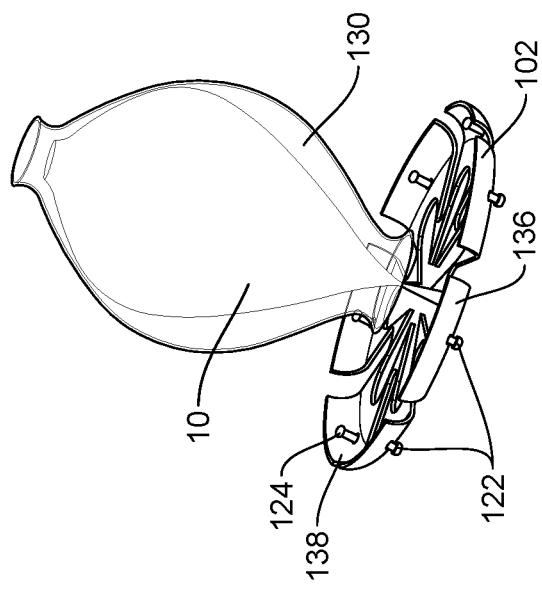
FIG. 3 shows a perspective view of a clip and membrane, according to the clipping system of FIG. 1 in a finally deployed configuration.

Upon final deployment of the clip 102, a membrane 130 attached to an interior of the end cap 110 may be released to trap the clipped target tissue 10 therein, as shown in FIG. 3. The clipped target tissue 10 may then be resected from surrounding tissue using any known technique (e.g., cautery snare), so that the resected tissue is contained within the membrane 130 to prevent seeding (e.g., of cancer cells) during removal of the target tissue 10 from the body. After being separated from the control members 120, the clip 102 remains clipped over the target tissue 10 as the endoscope 106, the end cap 110, the control members 120 and the tissue within the membrane 130 are removed from the body.

As described above and as shown in FIGS. 3-4, the clip 102 is substantially disc-shaped in the deployed configuration, including a circular outer edge 114 and a substantially planar body 112 defined via a first surface 136 which, in an operative position faces away from the end cap 110, and a second surface 138 which, in the operative position, faces toward the end cap 110. Although the body 112 in this embodiment is substantially planar, in an additional exemplary embodiment, the outer edge 114 of the body 112 may be curved in a direction toward the end cap 110 (i.e., so that the first surface 136 forms a concave shape).

The body 112 of the clip 102 may be formed of a shape memory alloy such as, for example, nitinol, and includes a first set of cut-outs 116 and a second set of cut-outs 118 extending through the body 112 from the first surface 136 to the second surface 138. The first and second set of cut-outs 116, 118 are configured to create a desired spring stiffness biasing the clip 102 to move from the open configuration to the closed configuration under this bias when the clip 102 is pushed off the end cap 110. According to an exemplary embodiment, the clip 102 is biased toward the closed configuration, in which the body 112 of the clip 102 maintains its substantially planar shape. That is, a radially outermost portion of the body 112 is bent proximally so that the first surface 136 forms a distal-facing, rounded radially outer edge of the end cap 110.

Each cut-out of the first set of cut-outs 116 extends through the planar body 112 from the first surface 136 to the second surface 138, and from the outer edge 114, radially inward toward a center point C of the circular body 112 so that the cut outs of the first set of cut-outs 116 are open to an exterior of the clip 102 at the outer edge 114. In an exemplary embodiment, each of the cut outs of the first set of cut-outs 116 has a slotted configuration elongated toward the center point C of the circular body 112.

Each of the cut-outs of the second set of cut-outs 118 extends through the planar body 112 from the first surface 136 to the second surface 138 and extends radially outward from a first end 132 at the center point C of the of the circular body 112 to a second end 134 extending between two adjacent cut-outs of the first set of cut-outs 116. Each of the cut-outs of the second set of cut-outs 118 has, in one embodiment, a substantially petal-shaped configuration. The first ends 132 of the second set of cut-outs 118 are open to one another so that the second set of cut-outs 118 forms a single opening 140, extending through the body 112 from the first surface 136 to the second surface 138, via which the clip 102 may be mounted over the end cap 110 in the open configuration.

The first and second sets of cut-outs 116, 118 define fingers 142 including tips 144 pointed, in the closed configuration, toward the center point C of the body 112. In the insertion configuration, in which the clip 102 is stretched over the end cap 110, the fingers 142 are pushed away from the center point C in the open configuration with the fingers 142 extending along an exterior surface 111 of the end cap 110 and with the tips 144 of the fingers 142 pointing toward the distal end 148 of the end cap 110. In the open configuration, the tips 144 are separated from one another so that an opening in the clip 102 is enlarged to facilitate the reception of tissue within the clip (i.e., tissue drawn into the end cap 110 will be received within the clip 102 that is stretched over the end cap 110 in the open configuration).

The clip 102 may be moved from the insertion configuration to the initial deployed configuration by pushing the clip 102 distally off the end cap 110 using the control members 120. As the clip 102 is pushed off the end cap 110, the fingers 142 of the clip 102 revert to the closed configuration under the natural spring bias of the clip 102 so that the body 112 returns to its deployed configuration with the tips 144 extending radially inward toward the center point C to grip the tissue received therebetween. According to an exemplary embodiment, each of the first and second sets of cut-outs 116, 118 includes at least three cut-outs to define at least three fingers 142. It will be understood by those of skill in the art, however, that the clip 102 may include more than three cut-outs in each of the first and second sets of cut-outs 116, 118 and, in one embodiment, as shown in FIGS. 1-4, may each include seven cut-outs to define seven fingers 142.

The clip 102 also includes a plurality of openings 152 extending therethrough from the first surface 136 to the second surface 138. Each of the openings 152 is configured to receive a portion of a corresponding one of the control members 120 therein. According to an exemplary embodiment, each opening 152 extends through a portion of the body 112 adjacent the outer edge 114, and between adjacent cut-outs of the first set of cut-outs 116. It will be understood by those of skill in the art that the number of openings 152 will correspond to a number of control members 120.

As discussed above, the clip 102 may be mounted to the insertion device, which may include any standard endoscope 106. The clip 102 may be mounted to the endoscope 106 via the end cap 110, which is sized, shaped and configured to be mounted over the distal end 108 of the endoscope 106. As will be understood by those of skill in the art, the endoscope 106 is configured to be inserted through a body lumen to a target area within the lumen and thus, must be sufficiently flexible to navigate through even tortuous paths of the body lumen.

Figure 7:
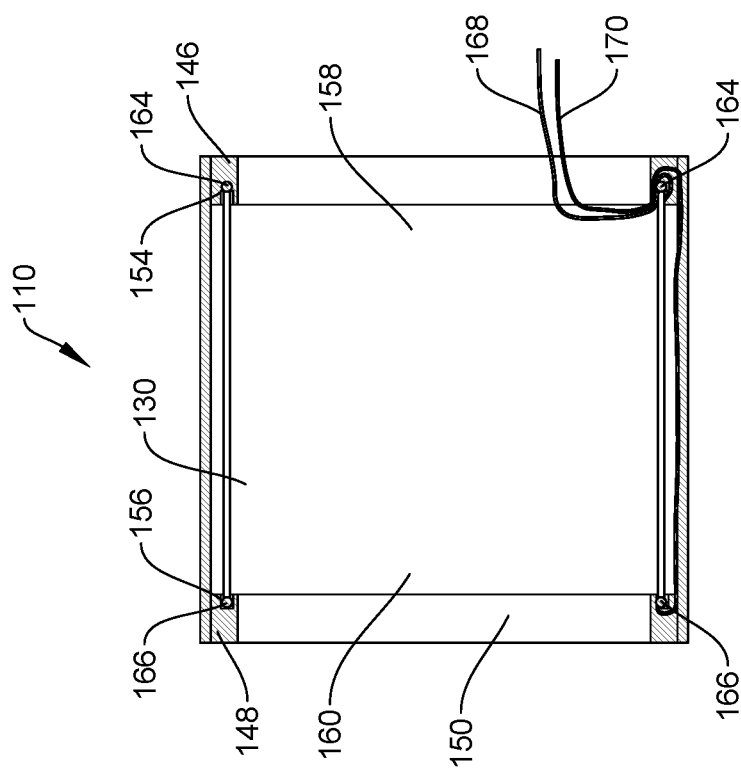
FIG. 7 shows a cross-sectional side view of the membrane attached to the end cap of FIG. 5.

The end cap 110, as shown in FIGS. 5-7, extends from a proximal end 146 to a distal end 148 and includes a channel 150 extending therethrough. In one embodiment, the end cap 110 is substantially cylindrical. It will be understood by those of skill in the art, however, that the end cap 110 may have any of a variety of shapes and configurations so long as the end cap 110 is configured to be mounted over the distal end 108 of the endoscope and includes a channel sized and shaped to receive a target portion of tissue to be clipped.

The end cap 110 of this embodiment is mounted over the endoscope 106 via, for example, a friction fit so that the channel 150 of the end cap 110 is substantially longitudinally aligned with a channel of the endoscope 106 to permit target tissue to be viewed through the channel 150 via a viewing system of the endoscope 106. In another embodiment, to enhance a visibility of the tissue and/or the clip 102, the end cap 110 may be formed of transparent material so that the user may see areas that would otherwise be blocked by the end cap 110.

As shown in FIGS. 6-7, the end cap 110 includes a proximal groove 154 extending about a periphery of the channel 150 at the proximal end 146 and a distal groove 156 extending about a periphery of the channel 150 at the distal end 148. Each of the proximal and distal grooves 154, 156 encircles the channel 150 for a length extending longitudinally, substantially parallel to a central axis of the channel 150. As will be described in further detail below, each of the proximal and distal grooves 154, 156 is configured to receive a portion of the membrane 130 therein so that the membrane is held open as tissue is drawn into the end cap 110 for clipping by the clip 102.

Figure 8:
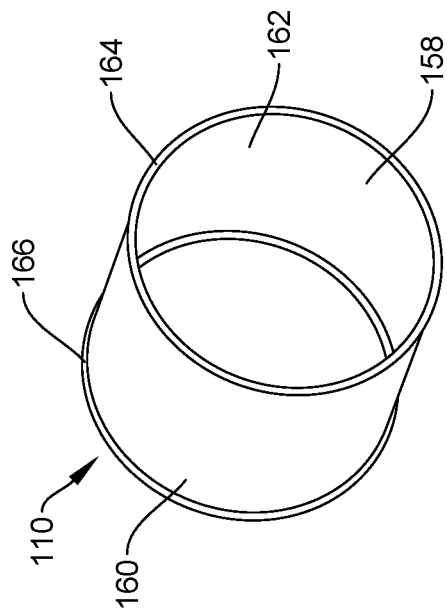
FIG. 8 shows a perspective view of the membrane of FIG. 7 in a tissue-receiving configuration.
Figure 9:
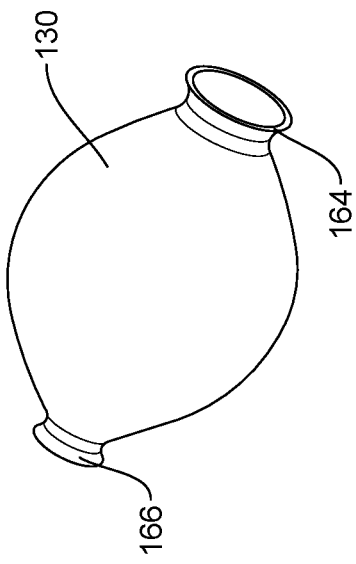
FIG. 9 shows a perspective view of the membrane of FIG. 7 in a collapsed configuration.

The membrane 130 of the embodiment shown in FIGS. 7-9 is comprised of silicone or any other suitable polymer and extends from a proximal end 158 to a distal end 160 and includes a channel 162 extending therethrough. The membrane 130 is configured to be moved between a tissue-receiving configuration (shown in FIGS. 7-8) in which an opening of the membrane 130 at the distal end 160 thereof is open so that tissue may be received within the channel 162 and a collapsed configuration (shown in FIG. 9) in which the opening at the distal end 160 sinch to a reduced diameter so that tissue received within the membrane 130 is trapped within the channel 162.

According to an exemplary embodiment, the membrane 130 includes a proximal band 164 at the proximal end 158 and a distal band 166 at the distal end 160. Each of the proximal and distal bands 164, 166 is biased toward the collapsed configuration, so that, when released, size of the channel 162 at the proximal and distal ends 158, 160 is reduced to trap tissue therewithin. The proximal and distal bands 164, 166, however, may be stretched to be received within the proximal and distal grooves 154, 156 of the end cap 110, respectively, in the tissue-receiving configuration, as shown in FIG. 7.

Thus, when the membrane 130 is attached to the interior of the channel 150 via the proximal and distal grooves 154, 156, the membrane 130 is held in the tissue-receiving configuration so that tissue drawn into the end cap 110 is received within the channel 150 of the membrane 130. When the proximal and distal bands 164, 166 of the membrane 130 are disengaged from the proximal and distal grooves 154, 156, respectively, the proximal and distal bands 164, 166 revert toward the collapsed configuration, trapping the tissue within the channel 150 of the membrane 130.

The membrane 130 may be moved from the tissue-receiving configuration toward the collapsed configuration via a first string 168 attached to the proximal band 164 and a second string 170 attached to the distal band 166. Each of the first and second strings 168, 170 is passed through, for example, a working channel of the endoscope 106 so that, when the first and second strings 168, 170 are drawn proximally relative to the endoscope 106, the proximal and distal bands 164, 166 are pulled out of the proximal and distal grooves 154, 156, allowing the membrane 130 to revert toward the collapsed configuration.

The extending members 126 extend along a length of the endoscope 106 from proximal ends accessible to a user via, for example, a user interface at a proximal end of the insertion device 104, to the distal ends 128. Each of the extending members 126 in this embodiment is configured as, for example, a nitinol hypotube, a plastic tube or any of a variety of structures having a coiled and/or substantially tubular configurations. The extending members 126 may have any of a variety of configurations so long as the extending members 126 are configured to slidably receive the control members 120 therein.

According to an embodiment, each of the extending members 126 extend through, for example, an outer shaft 172 extending from a proximal end connected to a portion of, for example, the user interface, to a distal end 174. In one embodiment, the distal ends 174 of the outer shafts 172 are attached to, for example, a ring 176 extending about the endoscope 106 immediately proximal of the end cap 110. The outer shafts 172 may be attached to the ring 176 via openings 178 extending through the ring 176.

In particular, each of the outer shafts 172 in this embodiment is attached to a corresponding one of the openings 178 of the ring 176 so that the extending members 126 are inserted through the outer shafts 172 and are longitudinally movable relative thereto. The distal ends 128 of the extending members 126 extend distally from the distal ends 174 of the outer shafts 172 to extend along an exterior of the end cap 110. The ring 176 is configured to maintain a desired orientation of each of the outer shafts 172 and extending members 126 relative to the endoscope 106.

According to one embodiment, each of the outer shafts 172 is equidistantly spaced relative to the other about a longitudinal axis of the endoscope 106. Although the ring 176 is shown and described as a separate component mounted over a portion of the endoscope 106, it will be understood by those of skill in the art that the ring 176 may have any of variety of configurations. According to another exemplary embodiment, the ring 176 may be integrally formed with the end cap 110. For example, the ring 176 may extend radially outward from the proximal end 146 of the end cap 110 to accommodate the distal ends 174 of the outer shafts 172.

As describe above, the control members 120 are received within the extending members 126 and extend from proximal ends connected to, for example, the user interface at the proximal end of the insertion device 104, to distal ends 122, which extend distally past the distal ends 128 of the extending members 126. In an exemplary embodiment, the distal ends 122 of the control members 120 are enlarged and coupled to the clip 102 via the openings 152. According to an exemplary embodiment, the enlarged distal ends 122 are sized and shaped so that the enlarged distal ends cannot pass through the openings 152.

In this embodiment, the enlarged distal ends 122 of the control members 120 engage the first surface 136 of the clip 102 so that a length of the control members 120 extends proximally from each of the enlarged distal ends 122, through the openings 152 and through the extending members 126 to the proximal end of the insertion device 104. In one embodiment, the enlarged distal ends 122 are affixed and/or adhered to the first surface 136 so that, upon final deployment of the clip 102, the enlarged distal ends 122 do not separate therefrom minimizing the possibility of shed parts.

As described above, the enlarged distal ends 122 are sized, shaped and configured so that the enlarged distal ends 122 cannot be passed proximally through the openings 152 of the clip 102. Similarly, the openings 152 are sized, shaped and configured to prevent the passage distally of the distal ends 128 of the extending members 126 therethrough. Thus, the body 112 of the clip 102 is held between the enlarged distal ends 122 of the control members 120 and the distal ends 128 of the extending members 126.

According to an exemplary embodiment, the enlarged distal end 122 of each of the control members 120 is configured to be released and/or separated from a remaining length of the corresponding control member 120 during the final deployment process. As described above, each enlarged distal end 122 in this embodiment is connected to the remaining length of the corresponding control member 120 via the joint 124 that is configured to break, fail, release, or otherwise separate when subject to a force exceeding a predetermined threshold force. In one embodiment, the joint 124 is configured as a reduced diameter portion of the control member 120. In another embodiment, the joint may be configured as an adhesive configured to give or fail when subject to the predetermined force.

In yet another embodiment, the joint be configured as a releasable coupling or other mechanical connection configured to release when subject to the predetermined force. It will be understood by those of skill in the art, however, that the joint 124 may have any of a variety of configurations so long as the joint 124 is configured to separate the enlarged distal end 122 from the remaining length of the control member 120 when subject to the predetermined threshold force.

Figure 12:
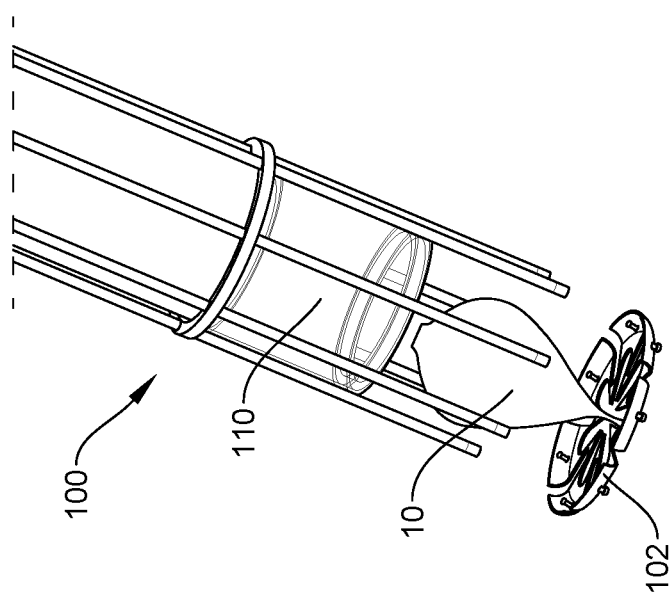
FIG. 12 shows a perspective view of the clip according to the clipping system of FIG. 1 in a final deployed configuration.

According to an exemplary embodiment, when it is desired to move the clip 102 toward the final deployed configuration, the control members 120 are drawn proximally relative to the extending members 126 so that the enlarged distal ends 122 and the clip 102 are pulled proximally against the distal ends 128 of the extending members 126. The clip 102 is pulled proximally against the extending member 126 until a force exerted on the joint 124 exceeds the predetermined threshold force required to cause the joint 124 to break, fail or otherwise separate. The distal ends 122 are thereby released from the remaining length of the control members 120, separating the clip 102 from the insertion device 104 as shown in FIG. 12.

Figure 11:
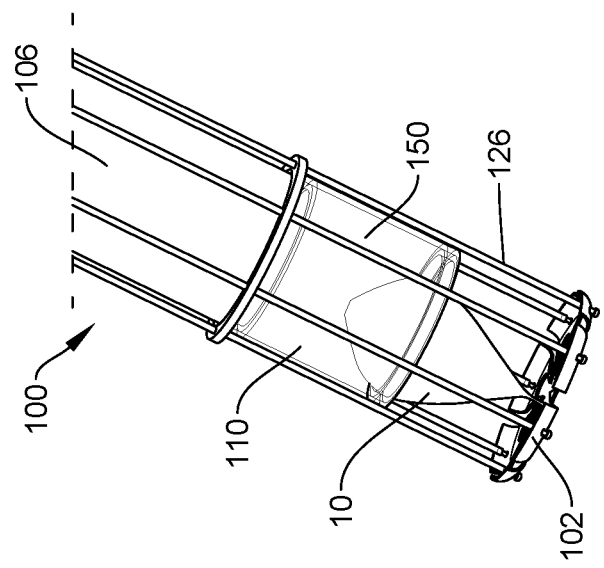
FIG. 11 shows a perspective view of the clip according to the clipping system of FIG. 1 in a review configuration.
Figure 10:
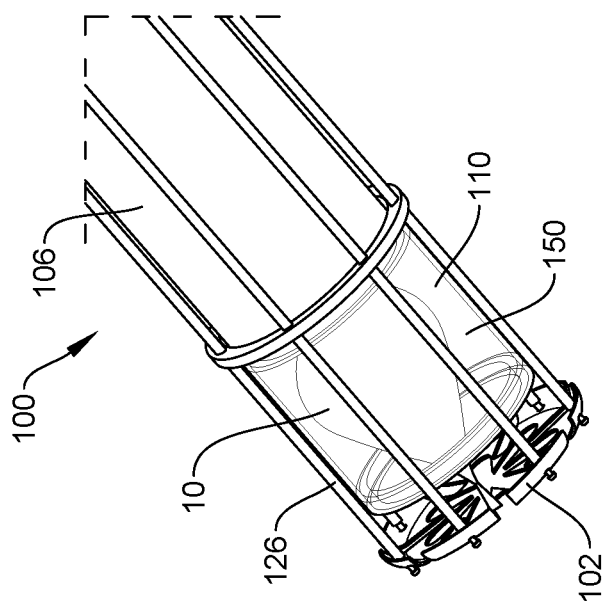
FIG. 10 shows a perspective view of the clip according to the clipping system of FIG. 1 in an initial deployed configuration.

According to one exemplary embodiment, the control members 120 and the extending members 126 are moved together, simultaneously, to move the clip 102 between the insertion configuration (FIG. 1), the initial deployed configuration (FIG. 2), and the review configuration (FIG. 11). In this embodiment, the distal ends 122 of the control members 120 are affixed to and/or contact the first surface 136 of the body 112 of the clip 102 while the distal ends 128 of the extending members 126 are positioned adjacent and/or against the second surface 138 of the body 112. Thus, the body 112 of the clip 102 is held between the distal ends 122, 128 of the control members 120 and the extending members 126, respectively, such that a simultaneous movement of the control members 120 and the extending members 126 correspondingly move the clip 102.

According to an exemplary embodiment, the control members 120 and the extending members 126 are locked relative to one another via the user interface so that movement of one of the control members 120 and the corresponding extending member 126 correspondingly moves the other of the control members 120 and its corresponding extending member 126. When it is desired to move the clip 102 toward the final deployed configuration, in this embodiment the control members 120 and the extending members 126 may then be unlocked relative to one another so that the control members 120 may be drawn proximally relative to the extending members 126, pressing the clip 102 proximally against the distal ends 128 of the extending members 126 via the distal ends 122 of the control members 120 until the force applied thereto exceeds the predetermined threshold value. The joint 124 then breaks, fails, or otherwise separates to release the clip 102 from the remaining length of the control members 120.

In another embodiment, the control members 120 and the extending members 126 remain independently movable relative to one another. Since, however, the distal ends 122 of the control members 120 are connected to and/or affixed to the body 112 of the clip 102, when the extending members 126 are moved distally relative to the endoscope 106 to push the clip 102 off the end cap 110 from the insertion configuration toward the initial deployed configuration, the control members 120 are correspondingly moved distally relative to the endoscope 106. To move the clip 102 from the initial deployed configuration toward the review configuration, the endoscope 106 is simply withdrawn proximally relative to the clip 102 so that the endoscope 106 is moves away from the clip 102 and the control members 120 and/or the extending members 126 that remain coupled to the clip 102.

To move the clip 102 toward the final deployment, the control members 120 are drawn into the extending members 126 as the endoscope 106 is advanced distally toward the clip 102 until the distal ends of the extending members 126 contact the clip 102—e.g., locking a position of the extending members 126—until the force applied to the joints 124 reaches the level required to release them, separating the clip 102 from the remaining lengths of the control members 120. At this point the clip 102 is completely separated from the endoscope 106 and the rest of the system 100 and the clip 102 is fully deployed and may be left in the body clipped over the target tissue.

If, however, in the review position the user determines that the clip 102 should be repositioned (i.e., before full deployment of the clip 102), the clip 102 may be moved back toward the insertion configuration by drawing the control members 120 and the extending members 126 proximally relative to the endoscope 106 to pull the clip 102 over the end cap 110 until the clip 102 is seated on the end cap 110 in the open configuration. The system 100 may then be repositioned adjacent to the target tissue and the process may be repeated until the tissue is clipped as desired. Once the clip 102 has been finally deployed, the clipped tissue trapped within the membrane 130 as described above may be severed (i.e., sliced away from the tissue gripped by the clip 102 on the side of the clip 102 further from the tissue wall from which the clipped tissue was drawn) and removed from the body.

According to yet another exemplary embodiment, the clip 102 may be moved between the insertion configuration, the initial deployed configuration and the review configuration via movement of the control members 120 relative to the endoscope 106. In this embodiment, the distal ends 122 of the control members 120 are affixed to the clip 102 so that movement of the control members 120 relative to the endoscope 106 correspondingly moves the clip 102. Only when it is desired to move the clip 102 toward the final deployed configuration will the extending members 126 be moved distally toward the clip 102 until the distal ends 122 are positioned immediately proximal and/or against the second surface 138 of the body 112 of the clip 102.

Then, similarly to the embodiment described above, the control members 120 may then be drawn proximally relative to the extending members 126 so that the clip 102 is drawn proximally against the distal ends 128 of the extending members 126, to apply a force to the control members 120. When this force exceeds the predetermined threshold value, the joint 124 fails, breaks or otherwise separates to release the clip 102 from the remaining lengths of the control members 120, so that the clip 102 is deployed in the final configuration, clipped over the target tissue 10. It will be understood by those of skill in the art that, in this embodiment, the joint 124 is configured so that the predetermined threshold force is greater than a force required to move the clip 102 between the insertion configuration, the initial deployed configuration, and the review configuration.

According to an exemplary method for tissue closure utilizing the clipping system 100, the clip 102 is inserted through a body lumen such as, for example, the GI tract, to a target area within the body lumen via the insertion device 104 which, in one embodiment, includes an endoscope 106. As described above, in the insertion configuration, the clip 102 is mounted to the distal end 108 of the endoscope 106 via the end cap 110. In particular, the end cap 110 is received within the opening 140 defined via the second set of cut-outs 118 so that the fingers 142 are deformed with the pointed tips 144 moved away from one another and the fingers 142 extending along an exterior surface 111 of the end cap 110 pointing distally. In this insertion configuration, the clip 102 is guided to the target area via the visualization system of the endoscope 106 and positioned over a target tissue 10.

A suction force and/or tissue graspers may be applied through a working channel of the endoscope 106 to draw the target tissue 10 into the channel 150 of the end cap 110. Thus, when the clip 102 is moved toward the initial deployed configuration (shown in FIG. 10) by a distal movement of the control members 120 and/or the extending members 126 relative to the endoscope 106, the clip 102 slides distally off of the end cap 110 and contracts to the biased closed configuration. As the clip 102 is moved toward the biased closed configuration, the pointed tips 144 of the fingers 142 are moved toward one another gripping the tissue received within the channel 150.

It will be understood by those of skill in the art that suctioning and/or gripping of the tissue in this initial deployed configuration may obstruct an imaging/optical lens of the endoscope 106 so that visualization of the clipped tissue to determine whether the target tissue has been properly clipped may be difficult. Thus, the clip 102 may be moved toward the review configuration (shown in FIG. 11) by drawing the endoscope 106 proximally relative to the clip 102, while the clip 102 remains engaged with the control members 120. As the distance between the end cap 110 and the clip 102 increases, a field of view of the endoscope 106 widens so that the clip 102, and the tissue gripped thereby, may be viewed more clearly via the optical/visualization system of the endoscope 106.

If, upon visualization, the user determines that the clip 102 requires an adjustment and/or a repositioning relative to the target tissue 10, the control members 120 and/or the extending members 126 may be translated proximally relative to the endoscope 106 until the clip 102 is moved proximally over the end cap 110, as described above, to return to the open insertion configuration releasing the previously clipped tissue. In particular, the endoscope 106 may be moved distally relative to the control members 120, so that the clip 102 and the end cap 110 are drawn toward one another. As the clip 102 is moved toward the open configuration, the tissue gripped thereby is released, permitting the clip 102 to be repositioned over the target tissue 10, as described above. The clip 102 may then once again moved toward the initial deployed configuration, and then again toward the review configuration. This process may be repeated, as necessary, until the user is able to visually confirm that the clip 102 has been clipped over the target tissue 10, as desired.

As discussed above, in one embodiment, the clip 102 is moved between the insertion configuration, the initial deployed configuration and the review configuration by moving both the control members 120 and the extending members 126 together, relative to the endoscope 106. In another embodiment, the clip 102 may be moved between the insertion configuration, the initial deployed configuration and the review configuration via movement of just the control members 120 relative to the endoscope 106. Only when it has been determined that the clip 102 is clipped over the target tissue 10 as desired, the extending members 126 may be moved distally relative to the endoscope 106 so that the distal ends 128 are positioned adjacent or against the second surface 138 of the body 112 of the clip 102.

Figure 13:
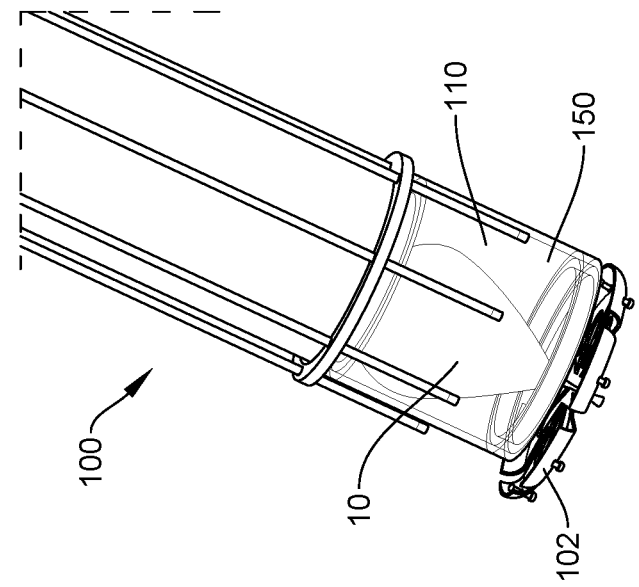
FIG. 13 shows a perspective view of the clipping system of FIG. 1 with clipped target tissue drawn into the end cap.

The clip 102 may then be moved to the final deployed configuration (shown in FIG. 12) by drawing the clip 102 proximally against the distal ends 128 via the control members 120 until a force exerted on the joint 124 exceeds a predetermined threshold value, causing the clip 102 to be released from the remaining length of the control members 120. Upon movement of the clip 102 to the final deployed configuration, the target tissue 10 may be drawn back into the channel 150 of the end cap 110, as shown in FIG. 13, so that the target tissue 10 may be trapped via the membrane 130. According to an exemplary embodiment, after the target tissue 10 has been drawn into the end cap 110, the user may release the membrane 130 by drawing the first and second strings 168, 170 proximally relative to the endoscope 106 so that the proximal and distal bands 164, 166 are pulled out of the proximal and distal grooves 154, 156, respectively, of the end cap 110.

Figure 14:
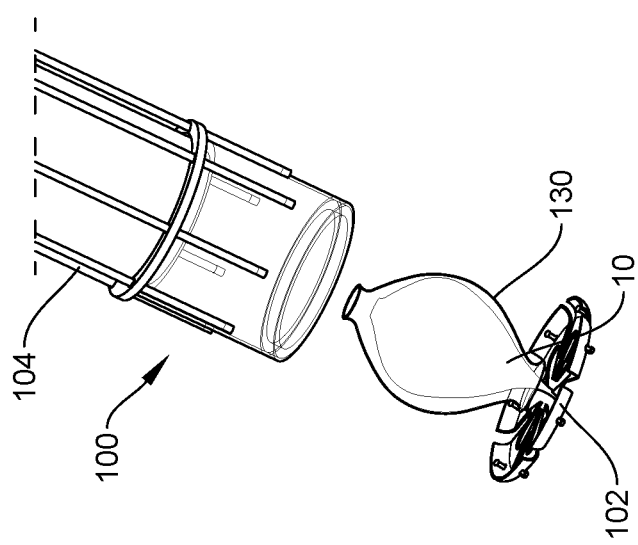
FIG. 14 shows a perspective view of the clipping system of FIG. 1 with a membrane released over target tissue.

As the proximal and distal bands 164, 166 are disengaged from the proximal and distal grooves 154, 156, respectively, the membrane 130 is released within the channel 150 and the bands 164, 166 are permitted to revert toward their collapsed configuration, trapping the target tissue 10 within the membrane 130, as shown in FIG. 14. This trapped tissue may then be severed from the adjacent tissue using any known technique. It will be understood by those of skill in the art that the membrane 130 will contain the severed tissue therein to minimize the risk of seeding cancer cells or other undesired tissue as this is removed from the body.

Figure 15:
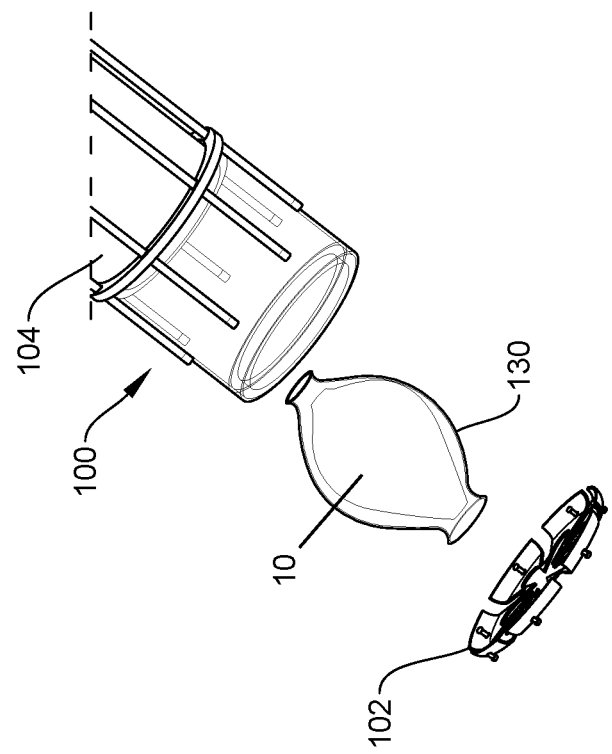
FIG. 15 shows a perspective view of the target tissue within the membrane and cut away from surrounding tissue.

Upon release of the membrane 130, the target tissue 10 may be cut away from the surrounding tissue, via, for example, a snare, cautery or other cutting device which may be inserted through the working channel of the endoscope 106. The target tissue 10 may be cut, for example, between the membrane 130 and the clip 102 so that, once the target tissue 10 has been cut away, the membrane 130 (with the target tissue 10 trapped therein) may be removed from the body lumen, as shown in FIG. 15, via graspers or other removal device. The insertion device 104 may then be removed from the body of the patient, leaving the clip 102 clipped over the wound/defect created by the cutting away of the target tissue 10. It will be understood by those of skill in the art that deployment of the clip 102 prior to cutting away of the target tissue 10 will help to prevent insufflation issues.

Figure 16:
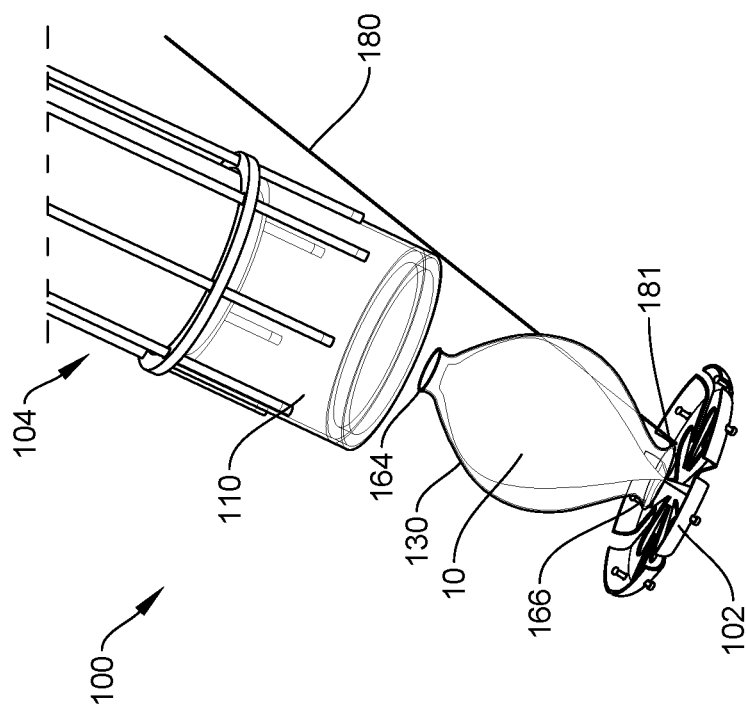
FIG. 16 shows a snare according to a further exemplary embodiment of the present disclosure.

Although the previous embodiments describe a cutting device separately inserted through the working channel to cut the target tissue 10 away from the surrounding tissue, in a further embodiment, a cutting device such as a snare 180 may be incorporated into the distal band 166 of the membrane 130, as shown in FIG. 16. Thus, when the membrane 130 is released to trap the target tissue 10 therein, a snare loop 181 extending about the distal band 166 may be used to simultaneously collapse the distal band 166 while cutting away the target tissue 10 from the surrounding tissue. In yet another exemplary embodiment, rather than incorporating the snare into the distal band of the membrane 130, the snare may be connected to a circumference of the clip 102 such that, upon the final deployment of the clip 102 and the release of the membrane 130, the snare may be pulled proximally from the clip 102 to cut tissue immediately proximal thereof.

Figure 17:
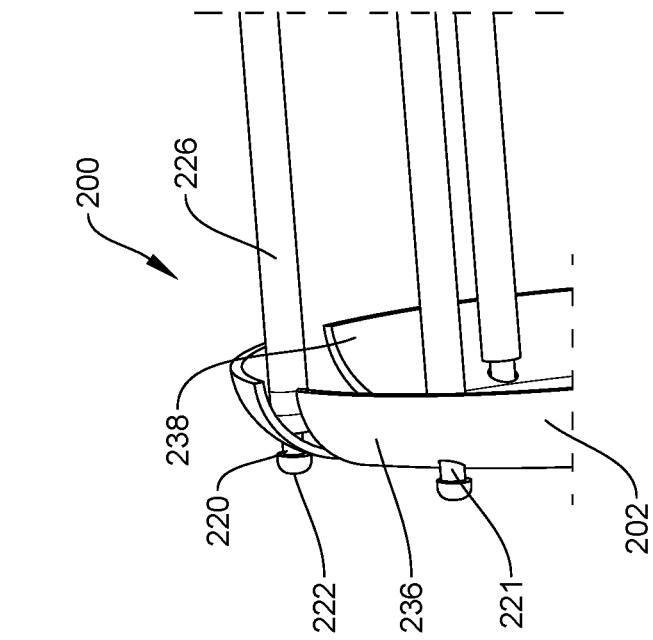
FIG. 17 shows a perspective view of a clipping system according to another exemplary embodiment of the present disclosure.
Figure 18:
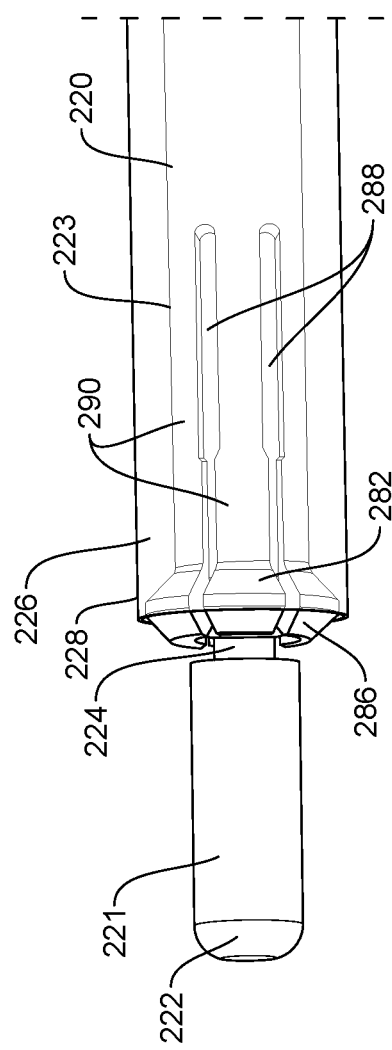
FIG. 18 shows partially transparent side view of a distal portion of control member and extending member, according to the exemplary clipping system of FIG. 17.
Figure 19:
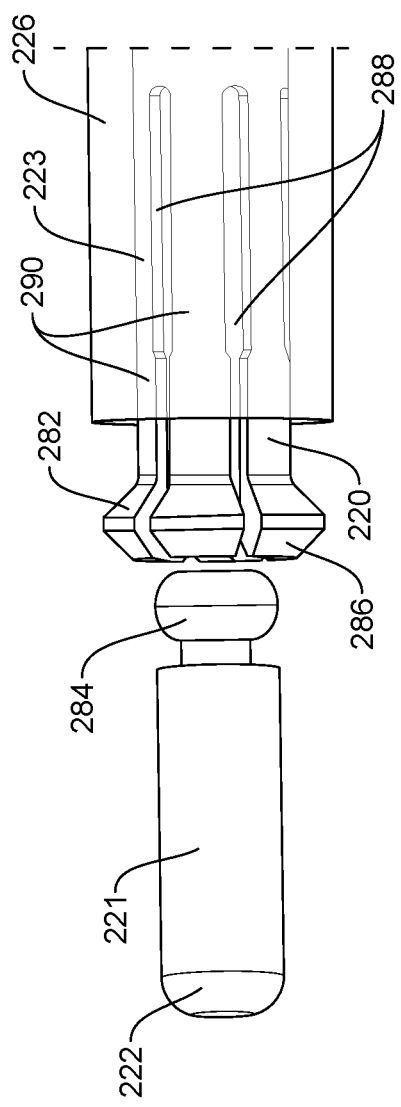
FIG. 19 shows a partially transparent side view of joint of the control member according to the exemplary clipping system of FIG. 16 in a released configuration.

Although the above exemplary embodiments describe control members 120 including joints 124 configured to break, release or otherwise separate when subject to a force exceeding a predetermined threshold value, according to another exemplary embodiment, a joint 224 for a control member 220 according to a clipping system 200, as shown in FIGS. 17-19, may include a collet 282 configured to release, for example, a ball-shaped proximal end 284. A plurality of control member 220 and may be releasably coupled to a clip 202, which is substantially similar to the clip 102, as described above, to move the clip 202 between an insertion configuration, an initial deployed configuration, and a review configuration.

Similarly to the system 100, the control members 220 extend through extending members P 226 so that the control members 220 and/or the extending members 226 may be moved longitudinally relative to an endoscope or other insertion device to move the clip 202 between the insertion, initial deployed, and review configurations. Although not shown, the clip 202 may be mounted to the distal end of the endoscope via an end cap substantially similarly to the end cap 110, in the insertion configuration.

According to this embodiment, as shown in FIGS. 18-19, each of the control members 220 includes a distal portion 221 and a proximal portion 223 connected via the joint 224. The distal portion 221 extends from an enlarged distal end 222, which engages a first surface 236 of the clip 202 in a manner substantially similar to the distal end 122 of the control member 120, to a ball-shaped proximal end 284, which extends proximally of a second surface 238 of the clip 202. Although the proximal end 284 of the distal portion 221 of each of the control members 220 is shown and described as ball-shaped, it will be understood by those of skill in the art that the proximal end 284 of the distal portion 221 may have any of a variety of shapes and sizes so long as the proximal end 284 is configured to be releasably engaged via the collet 282, as will be described in further detail below.

The proximal portion 223 of each of the control members 220 extends from a distal end 286 including the collet 282 to a proximal end connected to, for example, a user interface of the system 200. The collet 282 includes a plurality of longitudinal slots 288 extending proximally from the distal end 286 to define a plurality of arms 290 configured to receive the ball-shaped proximal end 284 therebetween. The longitudinal slots 288 allow the plurality of arms 290 to be moved toward one another to grip the ball-shaped proximal end 284 therein, as the collet 282 of each of the control members 220 is drawn proximally into a corresponding one of the extending members 226, as shown in FIG. 18.

Thus, while the clip 202 is being moved between the insertion configuration, the initial deployed configuration, and the review configuration, the collet 282 remains within the corresponding extending member 226 so that the joint 224 remains intact. When the collet 282 is moved distally out of the corresponding extending member 226, however, the arms 290 are permitted to deform radially outwardly to allow the ball-shaped proximal end 284 of the distal portion 221 to be removed therefrom, thereby releasing the joint 224.

Thus, while the clip 202 may be moved between the insertion configuration, the initial deployed configuration and the review configuration in a manner substantially similar to the clip 102, as described with respect to the system 100, when it is desired to move the clip 202 from the review configuration toward the final deployed configuration, rather than drawing the control members 220 proximally relative to the extending members 226, the extending members 226 are drawn proximally relative to the control members 220 until the collet 282 extends distally of a distal end 228 of the extending members 226. The control members 220 (and the extending members 226) may then be drawn proximally relative to the clip 202 so that the ball-shaped proximal end 284 is released from between the arms 290 of the collet 282, as shown in FIG. 19, thereby finally deploying the clip 202. Similarly to the system 100 described above, upon final deployment of the clip 202, a membrane may be released from within the end cap to trap target tissue 10 therewithin so that the target tissue 10 may be removed therefrom while preventing seeding of any, for example, cancer cells.

It will be apparent to those skilled in the art that various modifications may be made in the present disclosure, without departing from the scope of the disclosure. Furthermore, those skilled in the art will understand that the features of any of the various embodiments may be combined in any manner that is not inconsistent with the description and/or the functionality of the embodiments.

What is claimed is:

1. A clipping system for treating tissue, comprising:
    an end cap configured to be mounted over a distal end of an insertion device, the end cap extending from a proximal end to a distal end and including a channel extending therethrough;
    a clip including a body having first and second sets of cut-outs extending therethrough, the first and second cut-outs defining a plurality of fingers in the body, the fingers being configured to clip target tissue therebetween, each of the first cut-outs extending from a radially outer edge of the body toward a center point of the body, each of the second cut-outs extending from a first end at the center point toward a second end between adjacent ones of the first cut-outs so that the first ends of each of the second set of cut-outs are open to one another to form a single opening via which the clip is mountable over the end cap, the clip being movable between an insertion configuration, in which the clip is mounted over the end cap with the fingers extending along an exterior surface of the end cap so that tips of the fingers are separated from one another in an open configuration to receive tissue therebetween, and an initial deployed configuration, in which the clip is moved distally off of the end cap so that the tips of the fingers revert toward a biased closed configuration in which the tips are pointed radially inward toward the center point to grip tissue therebetween;

extending members extending along an exterior of the end cap and longitudinally movable relative thereto; and control members slidably received within the extending members, each of the control members being received within a corresponding one of the extending members so that distal ends of the control members extend distally past distal ends of the extending members to be releasably coupled to the clip so that longitudinal movement of one of the control members and the extending members relative to the end cap moves the clip between the insertion configuration, the initial deployed configuration, and a review configuration, in which the end cap is withdrawn proximally away from the clip while the control members remain coupled to the clip, the control member being operable to retract the clip proximally over the end cap to force the fingers open as the clip is retracted over the end cap, freeing the clip from tissue on which it had been clipped.

2. The system of claim 1, wherein the surface is substantially planar and wherein a radially outer edge of the clip curves proximally direction to facilitate retraction of the clip over the end cap toward the insertion configuration.

3. The system of claim 1, wherein each of the control members includes an enlarged distal end engaging a first surface of the body of the clip which, in an operative position, faces away from the end cap, so that a proximal portion of each of the control members extends proximally through a corresponding opening of the clip to a proximal end accessible to a user.

4. The system of claim 3, wherein the corresponding opening extends through a portion of the body of the clip adjacent the outer edge between adjacent ones of the first cut-outs, from the first surface of the body to a second surface of the body which, in the operative position, faces the end cap.

5. The system of claim 3, wherein the enlarged distal end of each of the control members is connected to a proximal portion thereof via a joint configured to release when subject to a force exceeding a predetermined threshold value.

6. The system of claim 5, wherein the control members and the extending members are configured so that proximal movement of the control members relative to the extending members draws the clip against the distal ends of the extending members to release the joint and move the clip toward a final deployed configuration.

7. The system of claim 6, wherein each of the control members includes a distal portion including the enlarged distal end and a ball-shaped proximal end, the joint including a first collet at a distal end of the proximal portion of a first one of the control members configured to releasably engage the ball-shaped proximal end of the distal portion of the first control member.

8. The system of claim 7, wherein, when the first collet is received within a corresponding one of the extending members, the first collet grips the ball-shaped proximal end of the distal portion of the first control member therein, and wherein the first collet is configured so that, when the first collet is moved distally out of the corresponding extending member, the first collet releases the ball-shaped proximal end of the distal portion of the first control member.

9. The system of claim 1, further comprising a membrane releasably attached to an interior of the channel of the end cap, the membrane extending from a proximal end to a distal and including a channel extending therethrough, the membrane configured to trap tissue received within the channel thereof when released from the end cap.

10. The system of claim 9, wherein the membrane includes a proximal band at the proximal end thereof and a distal band at the distal end thereof, the proximal and distal bands configured to move from a tissue-receiving configuration, in which the proximal and distal bands are expanded so that tissue may be received within the channel, to a collapsed configuration, in which the proximal and distal bands sinched to trap tissue in the channel.

11. The system of claim 10, wherein the distal band includes a snare configured to sever tissue received within the channel of the membrane from surrounding tissue as the distal band is moved from the tissue-receiving configuration to the collapsed configuration.

12. The system of claim 9, wherein the membrane is formed of silicone.

13. A clip for treating tissue, comprising:
a body defined via a first surface, a second surface and a curved outer edge;
a first set of cut-outs extending through the body from the first surface to the second surface, each of the first cut-outs extending from the outer edge toward a center point of the body so that each of the first cut-outs is open to an exterior of the clip at the outer edge; and
a second set of cut-outs, each of the second set of cut-outs extending through the body from the first surface to the second surface and from a first end at the center point of the body radially outward toward a second end between adjacent ones of the first cut-outs so that the first ends of the second cut-outs are open to one another to form a single opening via which the clip is mountable over a distal end of an insertion device, the first and second cut-outs defining a plurality of fingers including tips which, in a closed configuration, point toward the center point of the body.

14. The clip of claim 13, wherein the clip movable between an open configuration in which tips of the fingers are separated from one another so that tissue may be drawn between the fingers, and a closed configuration in which the tips of the fingers spring toward a closed configuration in which the tips point radially inward toward the center point to grip tissue therebetween.

15. The clip of claim 13, wherein the outer edge of the clip curves proximally so that the second surface which, in an insertion configuration, faces toward an end cap is convex.

16. A method for treating tissue, comprising:
inserting a clip to a target area in a body lumen via an endoscope, the clip mounted over a distal end of the endoscope via an end cap, in an open insertion configuration in which fingers of the clip extend along an exterior surface of the clip with tips of the fingers separated from one another to permit tissue to be received therebetween;
drawing target tissue into a channel of the end cap and between the fingers of the clip;
moving the clip from the open insertion configuration to an initial deployed configuration, in which the clip is pushed distally off of the end cap so that the clip springs to a closed configuration in which the tips of the fingers point toward a center point of the body to grip tissue received therebetween, wherein the fingers are defined via a first set of cut-outs and a second set of cut-outs, each of the first set of cut outs extending through the body from an outer edge toward a center point of the body so that each of the first cut-outs is open to an exterior of the clip at the outer edge, and the second cut-outs extend through the body from a first end at the center point of the body toward a second end between adjacent ones of the first cut-outs, wherein the first ends of the second cut-outs are open to one another to form a single opening via which the clip is mountable over the end cap in the insertion configuration; and drawing the endoscope proximally away from the clip, while the clip remains coupled to distal ends of control members to a review configuration.

17. The method of claim 16, wherein, when in the review configuration it is determined that the clip requires repositioning, drawing the control members proximally relative to the endoscope to draw the clip proximally over the end cap to the open insertion configuration, and repositioning the clip over the target tissue.

18. The method of claim 16, further comprising moving the clip from the review configuration to a final deployed configuration by drawing the control members proximally relative the endoscope to draw the clip proximally against distal ends of extending members through which the control members are slidably received, until a force exerted on the control members exceeds a predetermined threshold force, separating enlarged distal ends of the control members from remaining lengths of the control members to release the clip from the endoscope.

19. The method of claim 18, further comprising drawing the clipped target tissue into the channel of the end cap and then releasing a membrane releasably attached to an interior of the channel of the end cap over the target tissue to trap the target tissue therein.

20. The method of claim 19, further comprising cutting the trapped target tissue within the membrane from surrounding tissue and removing the membrane from the body lumen so that the clip remains clipped over the surrounding tissue.

* * * * *